J. W. & L. P. SCHIPPERS.
FILM SPLICER.
APPLICATION FILED MAR. 17, 1916.

1,209,339.

Patented Dec. 19, 1916.

Witness:
Jos. C. Devick.

Inventors:
John W. Schippers
Lavina P. Schippers
E. J. Andrews
atty.

UNITED STATES PATENT OFFICE.

JOHN W. SCHIPPERS AND LAVINA P. SCHIPPERS, OF CHICAGO, ILLINOIS.

FILM-SPLICER.

1,209,339.  Specification of Letters Patent.  Patented Dec. 19, 1916.

Application filed March 17, 1916. Serial No. 84,943.

*To all whom it may concern:*

Be it known that we, JOHN W. SCHIPPERS and LAVINA P. SCHIPPERS, citizens of the United States, residing at Chicago, in the county of Cook and State of Illinois, have invented certain new and useful Improvements in Film-Splicers, of which the following is a specification.

This invention relates to mechanism to be used in splicing moving picture films, or for other similar purposes, and has for its object providing a device for materially assisting the splicer in preparing the film for splicing, for holding the film while the splicing process is being completed, and for clamping the spliced ends firmly together until the film is dried sufficiently for handling.

Other objects of the invention will be apparent from a consideration of the drawings and the description hereinafter set forth.

Figure 1:
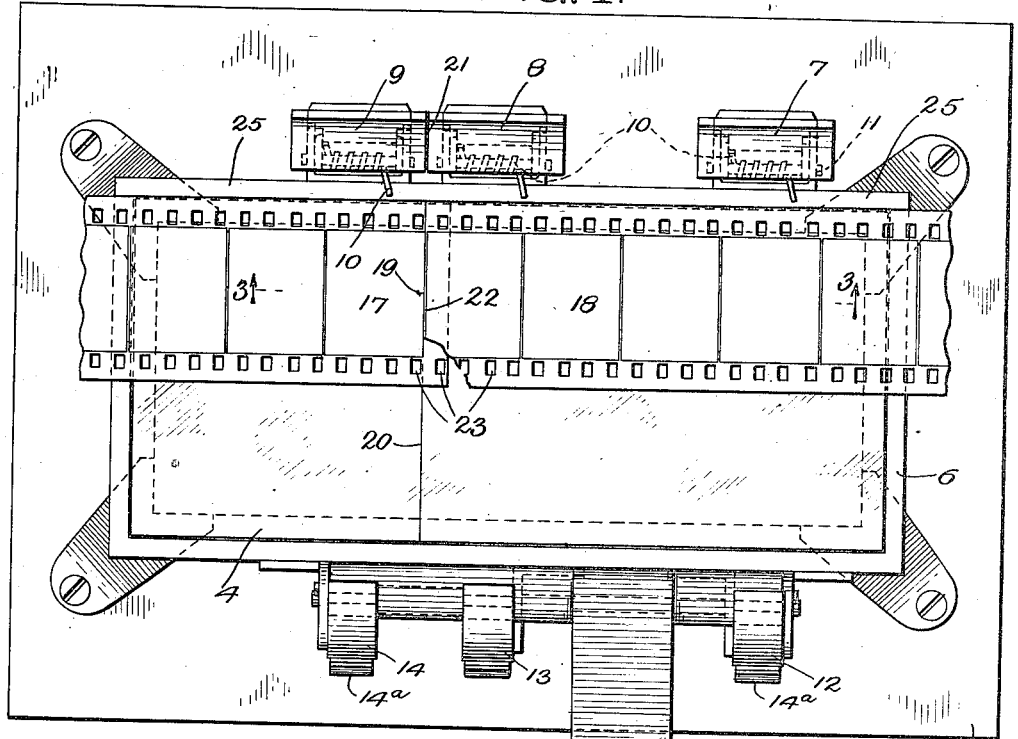
Figure 2:
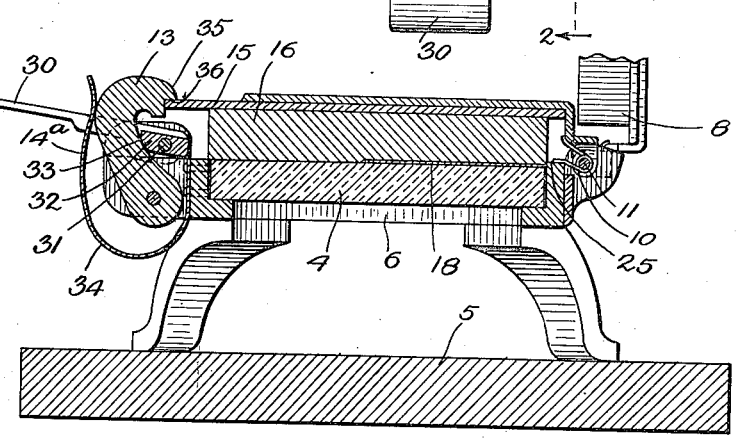
Figure 3:
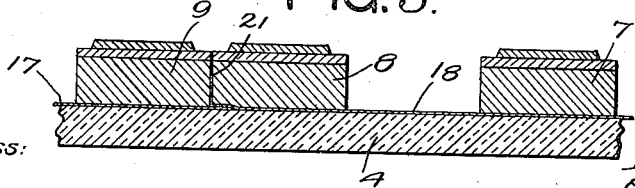

Of the drawings, Figure 1 is a plan view of a splicing device which embodies the features of our invention. Fig. 2 is a section along line 2—2 of Fig. 1; and Fig. 3 is a fragmental section along the line 3—3 of Fig. 1.

The device comprises a base 5, upon which is mounted a supporting frame work 6, which supports the plate 4, which forms a table upon which the films to be spliced are placed. The plate 4 may be made of any suitable material; we prefer a glass plate, which may be readily removed so as to be conveniently cleaned, thus preventing any injury to the films from dirt adhering thereto. The glass also allows better illumination of the various parts as the process is being carried out.

Pivoted to the side of the frame 6, by means of the pivots 11, are clamps 7, 8 and 9. Springs 10 encircling the pivots 11 are adapted to hold the clamps in the open position shown in Fig. 1; while catches 12, 13, and 14 are adapted to hold the clamps down on the upper face of the plate 4, as indicated in Fig. 2. Springs 14ᵃ force the catches against the upper plates 15 of the clamps and hold the lower portion 16 of the clamps firmly against the plate.

The lower portions 16 of the clamps we prefer to make out of rubber, or similar yielding material, so that the clamps will at all times press firmly on the films 17 or 18, preventing slipping thereof, and the yielding rubber prevents injury to the films or possibly to the glass plate.

When the films are to be spliced, the end of the film 17 is placed on the plate 4, so that the edge 19 of one of the pictures coincides with the transverse framer line 20 marked on the plate. When so placed, and with the clamp 9 locked down on to the film and the plate 4, the edge 21 of the clamp is exactly in line with the edge of the picture. The film 17 is placed with the gelatin side upward and when in this position, the gelatin may be quickly and conveniently removed by the application of suitable cleaning means; and, if liquid means are used, the rubber fitting snugly on the film and glass plate prevents the liquid from working inwardly and injuring the adjoining picture. When the end of film 17 is thus suitably cleaned, film 18 is placed on the plate with the end of the film cut even with the edge 22 of the end picture, and the end of the film is pushed against the edge 21 of the clamp 9, in the proper position. Clamp 7 is then locked in place, and film 18 is thereby held firmly in position, but with the end to be spliced free, so that it may be turned over on the back of clamp 7 in order to apply the adhesive material. Suitable adhesive material is then applied to the two film ends to be spliced together, the end of the film 18 is placed downwardly on the exposed end of the film 17, and the clamp 8 is locked in closed position and thus holds the spliced portion of the films firmly together until they are sufficiently dried to be handled.

By carrying out this process, by the use of our mechanism, the films may be properly alined and spliced quickly and conveniently so that the sprocket wheel openings 23 are properly spaced, and without in any way injuring the films.

When the edge 19 of the end picture is placed true to the framer line 20, and the edge 22 of the film 18 is properly placed against the edge of the clamp 9, the two films will be properly positioned when spliced. But to facilitate the proper positioning of the films with reference to each other a flange 25 may be used. By holding the films against this flange the operator is enabled to more conveniently and accurately aline the two films and hold them at right angles to the framer line 20.

To further facilitate the operation, a universal release key 30 is pivoted to the frame work, by means of the pivot 31. The key is fixed to a bar 32, which when the clamps are locked by the catches, presses against the surface 33 of the catches. By pressing downwardly on the key 30, the bar 33 forces all of the catches away from the clamps, thus unlocking the clamps and allowing the springs 10 to force them to their perpendicular positions away from the plate 4. Springs 34 hold the catches in the locked positions, but when the clamps are unlocked, by pressing them downwardly, the upper plates 15 thereof, will push the catches 35 backwardly, and this will allow the shoulders 36 to pass over the upper edge of the plate 15 and lock the clamps down.

Although we have described with some particularlity the various elements of the mechanism which we have provided, yet it should be understood that variations therein may be made by those skilled in the art without departing from the spirit of our invention as disclosed by the following claims.

We claim as our invention:

1. A film splicer comprising a plate, said plate having a framer line thereon, two clamps adapted to press against said plate, said clamps being positioned on opposite sides of said line, and a key for simultaneously releasing said clamps.

2. A film splicer comprising a plate, said plate having a framer line thereon, two clamps adapted to press against said plate, said clamps being positioned on opposite sides of said line, and the corner of one edge of one of said clamps substantially coinciding with said line.

3. A film splicer comprising a film support, a plurality of means for clamping films on to said support, and means for simultaneously releasing said clamping means.

4. A film splicer comprising a film support, a plurality of means for clamping films on to said support, means for simultaneously releasing said clamping means, and resilient means tending to move each of said clamping means away from said support.

5. A film splicer comprising a film support, a first means for clamping one end of a film on to said support, a second means a material distance from said first means for clamping another film on to said support, a third means adjacent said first means for clamping the ends of both of said films on to said support, and a universal release key for simultaneously releasing said clamping means.

In testimony whereof we hereunto set our hands.

JOHN W. SCHIPPERS.
LAVINA P. SCHIPPERS.